US011728507B2

United States Patent
Park et al.

(10) Patent No.: US 11,728,507 B2
(45) Date of Patent: *Aug. 15, 2023

(54) MULTI-LAYERED ELECTRODE FOR RECHARGEABLE BATTERY INCLUDING BINDER HAVING HIGH CRYSTALLINITY

(71) Applicant: LG Chem, Ltd., Seoul (KR)

(72) Inventors: Junsoo Park, Daejeon (KR); Taek Soo Lee, Daejeon (KR); Song Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 579 days.

This patent is subject to a terminal disclaimer.

(21) Appl. No.: 16/493,557

(22) PCT Filed: Nov. 9, 2018

(86) PCT No.: PCT/KR2018/013649
§ 371 (c)(1),
(2) Date: Sep. 12, 2019

(87) PCT Pub. No.: WO2019/093824
PCT Pub. Date: May 16, 2019

(65) Prior Publication Data
US 2020/0014056 A1    Jan. 9, 2020

(30) Foreign Application Priority Data

Nov. 9, 2017   (KR) .................. 10-2017-0148725
Nov. 8, 2018   (KR) .................. 10-2018-0136862

(51) Int. Cl.
| H01M 10/052 | (2010.01) |
| H01M 4/04 | (2006.01) |
| H01M 4/13 | (2010.01) |
| H01M 4/62 | (2006.01) |
| H01M 4/139 | (2010.01) |
| H01M 4/36 | (2006.01) |
| H01M 4/02 | (2006.01) |

(52) U.S. Cl.
CPC ....... *H01M 10/052* (2013.01); *H01M 4/0404* (2013.01); *H01M 4/0471* (2013.01); *H01M 4/13* (2013.01); *H01M 4/139* (2013.01); *H01M 4/366* (2013.01); *H01M 4/623* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 9,748,577 | B2 | 8/2017 | Son et al. |
| 2005/0130040 | A1 | 6/2005 | Yang et al. |
| 2007/0020385 | A1 | 1/2007 | Naoi et al. |
| 2010/0209770 | A1 | 8/2010 | Lim |
| 2016/0099483 | A1 | 4/2016 | Lee et al. |
| 2016/0218348 | A1 | 7/2016 | Son et al. |
| 2018/0006291 | A1 | 1/2018 | Kim et al. |
| 2019/0036154 | A1* | 1/2019 | Kim ............... H01M 4/525 |
| 2020/0020950 | A1 | 1/2020 | Nakayama et al. |

FOREIGN PATENT DOCUMENTS

| CN | 1619861 A | 5/2005 |
| CN | 110392947 A | 10/2019 |
| JP | 4581888 B2 | 11/2010 |
| JP | 2010282873 A | 12/2010 |
| JP | 2015076248 A | 4/2015 |
| JP | 2015118801 A | 6/2015 |
| KR | 20100094790 A | 8/2010 |
| KR | 20110107504 A | 10/2011 |
| KR | 20140015841 A | 2/2014 |
| KR | 20140132792 A | 11/2014 |
| KR | 20150028663 A | 3/2015 |
| KR | 20160092742 A | 8/2016 |
| KR | 20160111673 A | 9/2016 |
| WO | WO-2018097562 A1 * | 5/2018 ........ H01M 10/0525 |

OTHER PUBLICATIONS

Search report from International Application No. PCT/KR2018/013649, dated Mar. 8, 2019.
Search Report dated Feb. 23, 2022 from the Office Action for Chinese Application No. 201880018768.8 dated Mar. 2, 2022, 3 pages. [See p. 1-2, categorizing the cited references].

* cited by examiner

Primary Examiner — Robert S Carrico
(74) Attorney, Agent, or Firm — Lerner David LLP

(57) ABSTRACT

An electrode for a rechargeable battery in which a current collector is coated with an electrode mixture including an electrode active material and a binder includes a first electrode composite layer including PVdF as a first binder and an electrode active material and applied on a current collector; and a second electrode composite layer including a second binder and an electrode active material and applied on the first electrode composite layer, wherein crystallinity of the first binder is 58 or greater.

8 Claims, No Drawings

MULTI-LAYERED ELECTRODE FOR RECHARGEABLE BATTERY INCLUDING BINDER HAVING HIGH CRYSTALLINITY

CROSS-REFERENCE TO RELATED APPLICATIONS

The present application is a national phase entry under 35 U.S.C. § 371 of International Application No. PCT/KR2018/013649 filed on Nov. 9, 2018, which claims priority from Korean Patent Application No. 10-2017-0148725 filed on Nov. 9, 2017, and Korean Patent Application No. 10-2018-0136862 filed on Nov. 8, 2018, the disclosures of which are incorporated herein by reference.

TECHNICAL FIELD

The present invention relates to a multi-layered electrode for a rechargeable battery including a binder having high crystallinity.

BACKGROUND ART

As technical development and demand for mobile devices have increased, demand for rechargeable batteries as an energy source has rapidly increased. Among such rechargeable batteries, lithium rechargeable batteries having high energy density and operating potential, having a long cycle life, and having a low self-discharge rate have been commercialized and widely used.

Also, recently, as the interest on environment issues has grown, research into electric vehicles (EV), hybrid electric vehicles (HEV), and the like, which may replace vehicles based on fossil fuel, such as gasoline vehicles, diesel vehicles, which is one of the main causes of air pollution, has actively conducted. As a power source of the electric vehicles (EV), hybrid electric vehicles (HEV), and the like, lithium rechargeable batteries having high energy density, high discharge voltage, and output stability are mainly studied and used.

However, in such a development orientation, battery stability has been reduced, and thus, there have been attempts to solve the problem.

For example, if a battery pack is penetrated due to an external impact or external deformation, electrochemical energy inside the battery is converted into thermal energy, causing rapid heat generation, and ensuing heat causes a positive electrode or negative electrode material to make a chemical reaction, which causes a rapid exothermic reaction to cause the battery to be ignited or exploded, causing a stability problem.

In particular, it is known that an explosion due to needle-shaped penetration, or the like, occurs due to local IR-heat due to a short-circuit current due to contact between a nail and a current collector or between an electrode material and the current collector inside the battery.

That is, the local short-circuit causes an excessive current to flow, and the current causes heat generation. A magnitude of the short-circuit current due to the local short-circuit is in inverse proportion to resistance, and thus, the short-circuit current mostly flow to a side where resistance is low, and here, the current flows through a metal foil used as a current collector, and calculation of heat generation at this time shows that strong heat generation locally occurs around a portion penetrated by the nail.

Also, when heat generation occurs inside the battery, a separator contracts to cause a short-circuit between the positive electrode and the negative electrode, and repeated heat generation and contraction of the separator increase short-circuit sections to cause thermal runaway or cause the positive electrode, the negative electrode, and an electrolyte forming the inside of the battery to react each other or to be burnt. Here, the reaction is a huge exothermic reaction, so the battery may be ignited or exploded. Riskiness is a more important issue especially as lithium rechargeable batteries have higher capacity and energy density is increased.

In addition, in the case of a battery module or a battery pack designed to provide high output large capacity using multiple batteries as unit cells, the aforementioned stability issue may be more serious.

In order to solve the problem and enhance stability, in the related art, a material having high heat conductivity, a fire-proof material, or the like, is adhered to a pouch so that the other material may be penetrated first before the needle-shaped penetration, thus preventing overheating or ignition. This method, however, includes an additional process and incurs additional cost when manufacturing a rechargeable battery, increases a volume of the rechargeable battery, and reduces capacity per unit volume.

Therefore, the necessity for a rechargeable battery which may have enhanced stability and manufactured without an additional process or material is high.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to solve the aforementioned problems of the related art and technical problems requested from the past.

The inventors of the present application repeatedly conducted in-depth study and various experimentations to discover that the use of a binder having a high crystallinity in a partial electrode composite layer forming a multilayer electrode reduces an elongation percentage of the electrode to achieve a desired effect, thus completing the present invention.

Technical Solution

An exemplary embodiment of the present invention provides an electrode for a rechargeable battery in which a current collector is coated with an electrode mixture including an electrode active material and a binder, including:

a first electrode composite layer including PVdF as a first binder and the electrode active material and applied on a current collector; and a second electrode composite layer including a second binder and an electrode active material and applied on the first electrode composite layer, wherein crystallinity of the first binder is 58 or greater.

Here, the second binder may be, but not limited to, the same PVdF as the first binder, and here, the second binder may have crystallinity of less than 58.

The crystallinity, which represents a weight ratio of a crystal part in the entirety of a polymer solid including the crystal part and a non-crystal part, is changed depending on a type and a structure of a polymer and varied depending on a crystallization temperature, a cooling rate, an external force, and the like.

A method for measuring the crystallinity may include a density method which obtains crystallinity from two densities of the crystal part and the non-crystal part on the assumption of additive properties, a method based on measurement of heat of fusion, an X-ray method for obtaining crystallinity by dividing a strength distribution of an X-ray diffraction into a diffraction based on the non-crystal part and a diffraction based on a crystal part, an infrared ray method for obtaining crystallinity from a strength of a crystallinity band width of an infrared absorption spectrum, and the like. Crystallinity according to the present invention refers to a result obtained by measuring crystallinity by the X-ray method, in particular, an NMR measurement method.

In a general electrode, crystallinity of the PVdF measured by the above method is less than 58. This is because, the electrode is easily broken as the crystallinity of the PVdF is higher, and thus, if the crystallinity of the PVdF is too high, resistance is increased to cause a problem of an output, or the like.

Meanwhile, the inventors of the present application repeatedly conducted in-depth study to discover that safety of needle-shaped penetration of the electrode may be increased using such characteristics of the PVdF.

In detail, if the electrode layer includes only the PVdF having crystallinity of 58 or greater, flexibility of the electrode may be so low that resistance is increased and output characteristics are significantly reduced as mentioned above. Therefore, the inventors of the present application manufactured an electrode including two layers, in which a binder formed of PVdF and having a crystallinity of 58 or higher is used as a first binder in a first electrode composite layer coated on a current collector and a binder having a crystallinity of less than 58 as a second binder in a second electrode composite layer coated on the first electrode composite layer, thus reducing an elongation percentage of the electrode layer, without significantly degrading output characteristics, thus enhancing safety of needle-shaped penetration.

That is, since the electrode for a rechargeable battery having such a structure has a low elongation percentage, a short-circuit area of the current collector and the electrode material at the time of needle-shaped penetration may be reduced, obtaining the above-mentioned effect.

Also, according to the present invention, the crystallinity of the PVdF may be adjusted very simply and easily by regulating a drying temperature of the electrode.

In this connection, in order to enhance safety of needle-shaped penetration, in the related art, methods such as forming a separate ceramic powder coating layer, coating a material having a high elongation percentage on a pouch, or the like, have been proposed, but these methods inevitably use or include an additional material or additional process. In contrast, according to the present invention, the effect may be obtained using the electrode material used in the existing case as is and differentiating only a drying temperature, and thus, material cost and process efficiency are excellent.

Meanwhile, in order to prevent a degradation of the output characteristics of the electrode, while exhibiting the above-mentioned effect, a thickness of the first electrode composite layer is smaller than that of the second electrode composite layer, and specifically, the thickness of the first electrode composite layer may be 5 to 45%, more specifically, 5 to 30% with respect to the thickness of the second electrode composite layer.

If the thickness of the first electrode composite layer is too small to be outside the range, it is not sufficient to reduce the elongation percentage of the electrode, resulting in failure to ensure desired safety of the needle-shaped penetration, and if the thickness is too large, the overall electrode may be easily broken and resistance is increased to degrade the output characteristics, which is, thus, not desirable.

The electrode active material included in the first electrode composite layer and the second electrode composite layer is not limited to the known active materials.

Specifically, when the electrode for a rechargeable battery is a positive electrode, the electrode active material may include, as a positive electrode active material, for example, a layered compound such as lithium cobalt oxide ($LiCoO_2$), lithium nickel oxide ($LiNiO_2$), and the like, or a compound substituted to a transition metal of 1 or greater; a lithium manganese oxide such as a chemical formula $Li_{1+x}Mn_{2-x}O_4$ (here, x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiFe_3O_4$, $V_2O_5$, $Cu_2V_2O_7$; Ni site type lithium nickel oxide represented by chemical formula $LiNi_{1-x}M_xO_2$ (here, M=Co, Mn, Al, Cu, Fe, Mg, B, or Ga and x=0.01 to 0.3); a lithium manganese composite oxide represented by chemical formula $LiMn_{2-x}M_xO_2$ (here, M=Co, Ni, Fe, Cr, Zn, or Ta and x=0.01 to 0.1) or $Li_2Mn_3MO_8$ (here, M=Fe, Co, Ni, Cu, or Zn); lithium manganese composite oxide having a spinel structure represented by $LiNi_xMn_{2-x}O_4$; $LiMn_2O_4$ in which a portion of Li of chemical formula is substituted with alkaline earth metal ion; disulfide compound; $Fe_2(MoO_4)_3$, and the like, but is not limited thereto.

Meanwhile, when the electrode for a rechargeable battery is a negative electrode, the electrode active material may include, as a negative electrode active material, for example, at least one carbon-based material selected from the group consisting of crystalline artificial graphite, crystalline natural graphite, amorphous hard carbon, low crystalline soft carbon, carbon black, acetylene black, Ketjenblack, Super P, graphene, and fibrous carbon, Si-based material, $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group 1, group 2, group 3 elements of the periodic table, halogen; metal composite oxide such as $0<x \leq 1$; $1 \leq y \leq 3$; $1 \leq z \leq 8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; Li—Co—Ni-based material; titanium oxide; lithium titanium oxide, and the like, but is not limited thereto.

Also, here, the kind of the electrode active material may be different in the first electrode composite layer and the second electrode composite layer, but may be the same specifically in terms of manufacturing process.

In general, safety of needle-shaped penetration may be increased if a short-circuit area is reduced by lowering an elongation percentage of only any one of the positive electrode and the negative electrode. However, the negative electrode generally uses a Cu foil as a current collector, so it has an elongation percentage higher than that of the positive electrode which uses an Al foil as a current collector. Thus, although the elongation percentage is reduced by the method according to the present invention, there is a limitation in reducing the short-circuit area, and thus, reducing the elongation percentage of the positive electrode is more effective for reducing a short-circuit current.

Therefore, the electrode for a rechargeable battery may be, specifically, a positive electrode.

Meanwhile, the content of the first binder and the content of the second binder respectively included in the first electrode composite layer and the second electrode composite layer may be 1 to 15 wt % with respect to a total weight of each of the electrode composite layers.

If the content of each of the binders is too low to be outside the range, adhesion between the current collector and the active material or between the active materials is lowered so the desired effect of the present invention cannot be obtained, and if the content of each of the binders is too high, resistance in the electrode may be increased to degrade the characteristics of the battery, and since the content of the active material and other electrode materials is relatively low, capacity and conductivity of the electrode are lowered, which are, thus, not desirable.

In addition, each of the electrode composite layers may include various copolymers of one or more monomers selected from the group consisting of polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, or styrene monomer (SM), butadiene (BD), and butyl acrylate (BA), as additional binding agents, in addition to the first binder and the second binder.

The first electrode composite layer and the second electrode composite layer may include a conductive material having electronic conductivity to enhance conductivity.

The conductive material is not particularly limited as long as it has conductivity without causing a chemical change in the corresponding battery. For example, a conductive material such as graphite such as natural graphite, artificial graphite, and the like; carbon black such as acetylene black, ketjen black, channel black, furnace black, lamp black, summer black, and the like; conductive fiber such as carbon fiber, metal fiber, and the like; metal powder such as carbon fluoride, aluminum, nickel powder, and the like; conductive whiskey such as zinc oxide, potassium titanate, and the like; conductive metal oxide such as titanium oxide, and the like; conductive materials such as polyphenylene derivatives, and the like, may be used. Specific examples of the conductive material on the market include Chevron Chemical Company or denka black (Denka Singapore Private Limited) of an acetylene black line, Gulf Oil Company product, etc., Ketjenblack, EC line (Armak Company) product), Vulcan XC-72 (Cabot Company) product) and Super P (Product of Timcal company), and the like.

Here, the content of the conductive material may be 20 parts by weight to 100 parts by weight against 100 parts by weight of the first binder and the second binder.

If the content of the conductive material is less than 20 parts by weight so as to be outside the range, a desired degree of conductivity may not be obtained, and if the content of the conductive material exceeds 100 parts by weight, the content of the active material is relatively reduced to reduce capacity, which is, thus, not desirable.

In some cases, a filler, as a component suppressing expansion of the electrode, may be selectively added. The filler is not particularly limited as long as it is a fibrous material without causing a chemical change in the corresponding battery, and may be, for example, an olefin polymer such as polyethylene, polypropylene, and the like; and a fibrous material such as glass fiber and carbon fiber.

Also, other components such as a viscosity controlling agent, an adhesion promoter, and the like, may be further included selectively or as a combination of two or more thereof.

The viscosity controlling agent, as a component for controlling viscosity of an electrode mixture to facilitate a mixing process of the electrode mixture and a coating process thereof on the current collector, may be added in the amount of 30 wt % with respect to the total weight of the electrode mixture. The viscosity controlling agent may be, for example, carboxymethylcellulose, polyvinylidene fluoride, and the like, but is not limited thereto. In some cases, the aforementioned solvent may also serve as the viscosity controlling agent.

The adhesion promoter, as an auxiliary component added to enhance adhesion of the active material to the current collector, may be added in the amount of 10 wt % or less against the binder. The adhesion promoter may include, for example, oxalic acid, adipic acid, formic acid, an acrylic acid derivative, an itaconic acid derivative, and the like.

Meanwhile, the current collector of the electrode for a rechargeable battery according to the present invention may have a thickness of 3 to 500 μm. The current collector is not particularly limited as long as it has conductivity without causing a chemical change in the corresponding electrode. For example, the current collector may be formed of copper, stainless steel, aluminum, nickel, titanium, and sintered carbon, or copper, aluminum, stainless steel surface-treated with carbon, nickel, titanium, silver, and the like, or an aluminum-cadmium alloy, and the like. The current collector may have fine protrusions and depressions formed on a surface thereof to enhance adhesion of the electrode active material, and may have various forms such as a film, a sheet, a foil, a net, a porous body, foam, non-woven fabric, and the like.

The present invention further provides a method for manufacturing an electrode for a rechargeable battery according to the present invention.

First, the electrode for a rechargeable battery including a first electrode composite layer and a second electrode composite layer according to the present invention may be manufactured, for example, by a method including:

(i) applying a slurry including PVdF as a first binder and an electrode active material to a current collector, subsequently first drying the slurry at 120 to 140° C. under an air atmosphere, and secondly drying the slurry at 150 to 190° C. in a vacuum state to form a first electrode composite layer; and (ii) applying a slurry including a second binder and an electrode active material to the first electrode composite layer and subsequently drying the slurry at 120 to 140° C. under an air atmosphere and rolling the dried slurry to form a second electrode composite layer.

As mentioned above, crystallinity of PVdF according to the present invention may be adjusted by regulating a drying temperature of the electrode.

In detail, the crystallinity of the PVdF is increased as the vacuum drying temperature is increased. Thus, in addition to first drying the first electrode composite layer to volatilize NMP, the second vacuum drying temperature may be a temperature higher than 130° C., which is a general electrode drying temperature, that is, 150° C. to 190° C., specifically, 160° C. to 190° C.

If the second drying temperature is too low to be outside the range, the desirable crystallinity of the PVdF cannot be obtained, and if the second drying temperature is too high, the other electrode materials may be changed in characteristics or broken, which is, thus, not desirable.

The first drying of the slurry for forming the first electrode composite layer, as a process for volatilizing NMP, may be performed for about 2 minutes to 5 minutes, and the second drying, which aims at increasing crystallinity of the PVdF, may be performed for about 12 hours to 30 hours.

Also, the drying temperature of the second electrode composite layer may be a general electrode drying temperature similar to that of the related art, i.e., 120° C. to 140° C., and specifically, 130° C. In this case, since crystallinity of the second binder is maintained to be less than 58, the entire electrode may not have characteristics of being easily broken, and since resistance is not increased, a degradation of output characteristics may be prevented. Here, drying of the second electrode composite layer, also as a process for volatilizing NMP, may be performed for about 2 minutes to 5 minutes.

As the coating method, drying, rolling, and the like, coating, drying, rolling, and the like, of the electrode manufacturing method known in the art may be applied without any particular limitation.

The electrode manufacturing method according to the present invention may be changed in a partial process as necessary, and these should be interpreted to be included in coverage of the present invention. For example, rolling may be performed during the process of forming each electrode composite layer.

The electrode for a rechargeable battery according to the present invention may be used in a lithium rechargeable battery.

The lithium rechargeable battery may have a structure in which an electrode assembly including electrodes, i.e., a positive electrode and a negative electrode and a separator interposed therebetween is filled with lithium salt-containing non-aqueous electrolyte.

The separator is interposed between the positive electrode and the negative electrode and may be an insulating thin film having high ion permeability and mechanical strength. A diameter of a pore of the separator is generally 0.01 to 10 μm and a thickness thereof is generally 5 to 300 μm. As the separator, a sheet or non-woven fabric formed of an olefin polymer such as polypropylene having chemical resistance and hydrophobic properties, glass fiber, polyethylene, or the like, is used In some cases, the separator may be coated with a gel polymer electrolyte to enhance stability of the battery. Typical gel polymers include polyethyleneoxide, polyvinylidenefluoride, polyacrylonitrile, and the like. When a solid electrolyte such as a polymer, or the like, is used as the electrolyte, the solid electrolyte may also serve as the separator.

The lithium salt-containing non-aqueous electrolyte may include a non-aqueous electrolyte and lithium salt, and the non-aqueous electrolyte includes a non-aqueous organic solve, an organic solid electrolyte, an inorganic solid electrolyte, and the like, but is not limited thereto.

Examples of the non-aqueous organic solvent may include aprotic organic solvent such as N-methyl-2-pyrrolidinone, propylene carbonate, ethylene carbonate, butylene carbonate, dimethyl carbonate, diethyl carbonate, ethylmethyl carbonate, gamma-butylolactone, 1,2-dimethoxyethane, 1,2-diethoxyethane, tetrahydroxyfuran, 2-methyltetrahydrofuran, dimethylsulfoxide, 1,3-diosolane, 4-methyl-1, 3-dioxen, diethyl ether, formamide, dimethyl formamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

The organic solid electrolyte may include, for example, a polymeric material including polyethylene derivatives, polyethylene oxide derivatives, polypropylene oxide derivatives, a phosphate ester polymer, poly agitation lysine, polyester sulfide, a polyvinyl alcohol, a polyvinylidene fluoride, ionic dissociation group, and the like.

The inorganic solid electrolyte may include, for example, nitride of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like, halide, sulfate, and the like.

The lithium may be a material easily dissolved in the non-aqueous electrolyte and include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, lithium chloroborane, lower aliphatic carboxylic acid lithium, lithium 4-phenylborate, imide, and the like.

Also, in order to improve charge/discharge characteristics, flame retardancy, and the like, pyridine, triethylphosphite, triethanolamine, cyclic ether, ethylenediamine, n-glyme, hexafluorophosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethanol, trichloro-aluminum, and the like, may be added to the lithium salt-containing non-aqueous electrolyte. In some cases, in order to impart nonflammability, a halogen-containing solvent such as carbon tetrachloride, ethylene trifluoride, and the like, may be further included, and in order to enhance high-temperature storage characteristics, a carbon dioxide gas may be further included.

In a specific example, a lithium salt-containing non-aqueous electrolyte may be manufactured by adding lithium salt such as $LiPF_6$, $LiClO_4$, $LiBF_4$, $LiN(SO_2CF_3)_2$, and the like, to a mixture solvent of cyclic carbonate of EC or PC, as a high dielectric solvent and linear carbonate of DEC, DMC, or EMC as a low viscosity solvent.

MODE FOR INVENTION

Hereinafter, the present invention will be described in detail through embodiments, but the embodiments below are provided to exemplify the present invention and scope of the present invention is not limited thereto.

Comparative Example 1

$LiNi_{0.3}Co_{0.3}Mn_{0.3}O_2$ was used as a positive electrode active material. 96 wt % of $LiNi_{0.3}Co_{0.3}Mn_{0.3}O_2$ and 2.0 wt % of Super-P (conductive material), and 2.0 wt % of PVdF (first binder) were added to N-methyl-2-pyrrolidone (NMP) which is a solvent to prepare a first positive electrode active material slurry.

The first positive electrode active material slurry was applied on an aluminum foil to have a thickness of 50 μm, and dried at a rate of 0.2 m/min. (rate of drying for about 5 minutes) in a dryer under an air atmosphere of 130° C. for NMP drying to form a first positive electrode composite layer, and a second positive electrode active material slurry obtained by adding $LiNi_{0.3}CO_{0.3}Mn_{0.3}O_2$ as a positive active material, Super-P as a conductive material, and PVdF as a binder in a weight ratio of 96:2:2 to NMP was applied to have a thickness of 100 μm on the first positive electrode composite layer and dried at a rate of 0.2 m/min. (rate of drying for about 5 minutes) in a dryer having a temperature of 130° C. under an air atmosphere to form a second positive electrode composite layer, and thereafter, the second positive electrode composite layer was rolled to form a positive electrode.

Comparative Example 2

A positive electrode was manufactured in the same manner as that of Comparative Example 1, except that the first positive electrode active material slurry prepared in Comparative Example 1 was applied to have a thickness of 50 μm on an aluminum foil and NMP was dried at a rate of 0.2 m/min. in a dryer under an air atmosphere having a temperature of 130° C. and dried again for 24 hours at 130° C. in a vacuum state to form a first positive electrode composite layer.

Inventive Example 1

A positive electrode was manufactured in the same manner as that of Comparative Example 1, except that the first positive electrode active material slurry prepared in Comparative Example 1 was applied to have a thickness of 50 μm on an aluminum foil and NMP was dried at a rate of 0.2 m/min. in a dryer under an air atmosphere having a temperature of 130° C. and dried again for 24 hours at 160° C. in a vacuum state to form a first positive electrode composite layer.

Inventive Example 2

A positive electrode was manufactured in the same manner as that of Comparative Example 1, except that the first positive electrode active material slurry prepared in Comparative Example 1 was applied to have a thickness of 50 μm on an aluminum foil and NMP was dried at a rate of 0.2 m/min. in a dryer under an air atmosphere having a temperature of 130° C. and dried again for 24 hours at 190° C. in a vacuum state to form a first positive electrode composite layer.

Experimental Example 1

Crystallinity of the PVdF of each the first positive electrode composite layers and elongation percentage and flexibility of the electrodes in the positive electrodes manufactured in Comparative Examples 1 and 2 and Inventive Examples 1 and 2 were measured and illustrated in Table 1 below. To this end, electrodes in which only the positive electrode composite layer was formed in Comparative Examples 1 and 2 and Inventive Examples 1 and 2 were separately prepared.

Here, the crystallinity, elongation percentage, and flexibility were measured in the following manner.

Crystallinity: Electrodes in which only the first positive electrode composite layer was formed were vacuum-dried at 45° C. and a portion of each electrode layer was scraped with a razor blade, and NMR of powder was subsequently measured. An analysis method is as follows. After measurement, areas of peaks of crystalline and non-crystalline at main peaks of the PVdFs were obtained and a percentage (%) of the area of the crystalline in the sum of the areas is calculated to obtain crystallinity.

A used device was Agilent 600 MHz NMR/1.6 mm MAS probe.

Elongation percentage: Electrodes in which only the first positive electrode composite layer is formed are manufactured in the form of a dogbone, and the dogbone is pulled out at a rate of 5 mm/min. using UTM equipment (INSTRON—Electromechanical 3300), and an elongated length before the sample is broken is measured.

Flexibility: A bar is manufactured for each pi, and the electrodes in which only the first positive electrode composite layer is formed is cut to have a width of 10 cm and a length of 30 cm. The cut electrode was bent in half, the bar was brought into contact therewith and both ends of the electrodes are lifted at a rate of 10 mm/min. Here, the both ends of the electrode are lifted until a force measured in the UTM reaches 5N. The electrode was measured for each pi to observe whether cracks are formed through an optical microscope, and if there is no crack, testing is performed with a smaller pi.

TABLE 1

| Additional dying temperature (° C.) | Crystallinity | Elongation percentage (%) | flexibility (1Δ) |
|---|---|---|---|
| (Comparative Example 1) | 48.2 | 1.77 | 5 |
| 130° C. (Comparative Example 2) | 56.1 | 1.52 | 5 |
| 160° C. (Example 1) | 59.7 | 1.33 | 6 |
| 190° C. (Example 2) | 61.1 | 1.25 | 6 |

Comparative Example 3

The first positive electrode active material slurry of Comparative Example 1 was applied to have a thickness 150 μm on an aluminum foil and dried at a rate of 0.2 m/min. (rate of drying for about 5 minutes) in a dryer having a temperature of 130° C. under an air atmosphere to form a positive electrode composite layer, and the positive electrode composite layer was then rolled to manufacture a positive electrode.

Experimental Example 2

Manufacturing of Negative Electrode

Artificial graphite was used as a negative electrode active material. A negative electrode active material slurry prepared by adding 96.3 wt % of artificial graphite, 1.0 wt % of Super-P (conductive material), and 2.7 wt % of PVdF (bonding agent) to NMP as a solvent was applied to have a thickness of 70 μm on a copper foil and dried at a rate of 0.2 m/min. (rate of drying for about 5 minutes) in a dryer having a temperature of 130° C. under an air atmosphere and rolled to manufacture a negative electrode.

Manufacturing of Rechargeable Battery

Rechargeable batteries were manufactured using the positive electrodes and negative electrodes manufactured in Inventive Examples 1 and 2 and Comparative Examples 1 to 3, a poly ethylene film (Celgard, thickness: 20 μm) as a separator, and a liquid electrolyte in which 1M of $LiPF_6$ was dissolved in a solvent obtained by mixing ethylene carbonate, dimethylene carbonate, and diethyl carbonate in a ratio of 1:2:1.

Experiment of Safety of Nail Penetration

Five rechargeable batteries manufactured using the positive electrodes of Inventive Examples 1 and 2 and Comparative Examples 1 to 3 were prepared to be fully charged at 4.24V. The center of each of the batteries was penetrated from above using a nail formed of iron and having a diameter of 2.5 mm using a nail penetration tester, and ignition of the batteries was measured.

Here, a penetration rate of the nail was constant as 12 m/min., and results thereof are illustrated in Table 2 below.

TABLE 2

|  | Ignition number | Highest temperature of non-ignition sample (° C.) |
| --- | --- | --- |
| Inventive Example 1 | 1 | 78 |
| Inventive Example 2 | 0 | 42 |
| Comparative Example 1 | 5 | — |
| Comparative Example 2 | 5 | — |
| Comparative Example 3 | 5 | — |

As illustrated in Table 1, it can be seen that the rechargeable batteries using the positive electrode according to the present invention are reduced in a short-circuit area, and thus, a short-circuit current is reduced to enhance safety. In particular, it can be seen that, when crystallinity was 58.5 or greater by setting the vacuum dry temperature to 190° C., ignition rarely occurred.

Comparative Example 4

The first positive electrode active material slurry prepared in Comparative Example 1 was applied to have a thickness of 150 μm on an aluminum foil, dried at a rate of 0.2 m/min. in a dryer having a temperature of 130° C. under an air atmosphere, and dried again for 24 hours at 160° C. in a vacuum state to form a positive electrode composite layer. The positive electrode composite layer was then rolled to manufacture a positive electrode.

Comparative Example 5

A positive electrode was manufactured in the same manner as that of Comparative Example 1, except that the first positive electrode active material slurry prepared in Comparative Example 1 was applied to have a thickness of 50 μm on an aluminum foil and NMP was dried at a rate of 0.2 m/min. in a dryer under an air atmosphere having a temperature of 130° C. and dried again for 24 hours at 160° C. in a vacuum state to form a first positive electrode composite layer, and a second positive electrode active material slurry was applied to have a thickness of 100 μm on the first positive electrode composite layer, dried at a rate of 0.2 m/min. in a dryer having a temperature of 130° C. under an air atmosphere, and dried again for 24 hours at 160° C. in a vacuum state to form a positive electrode composite layer.

Experimental Example 3

The positive electrode of Comparative Example 4 was vacuum-dried again at 45° C. and a portion of the electrode layer was scraped out with a razor blade, and NMR of powder was measured. An analysis method is as follows. After measurement, areas of peaks of crystalline and non-crystalline at main peaks of the PVDFs were obtained and a percentage (%) of the area of the crystalline in the sum of the areas was calculated to obtain crystallinity.

A used device was Agilent 600 MHz NMR/1.6 mm MAS probe.

According to the measurement results, crystallinity was 59.7. That is, it can be seen that, when drying was performed again at 160° C. in the vacuum state, crystallinity of the PVdF was 59.7.

Evaluation of Output Characteristics

The rechargeable battery manufactured according to Experimental Example 2 using the positive electrodes manufactured in Inventive Examples 1 and 2 and Comparative Examples 4 and 5 was charged to 4.2V by 0.1 C and discharged to 2.5V with 0.1 C during two cycles, and thereafter, it was charged to 4.2V with 0.33 C and discharged to SOC 50 with 0.33 C and resistance was measured for 30 seconds at SOC 50 with 3 C. Results thereof are illustrated in Table 3 below.

TABLE 3

|  | output (mohm) |
| --- | --- |
| Inventive Example 1 | 1.87 |
| Inventive Example 2 | 1.95 |
| Comparative Example 4 | 1.92 |
| Comparative Example 5 | 1.97 |

Referring to Table 3, it can be seen that the batteries using the positive electrodes of Comparative Examples 4 and 5 have high resistance, relative to Inventive Example 1. In addition, it can be seen that Comparative Example 5 has high resistance, as compared with Inventive Example 2 in which the first positive electrode active material was vacuum-dried at a higher temperature.

This is because, in the case of the positive electrodes manufactured according to Comparative Examples 4 and 5, the second positive electrode composite layers also underwent a vacuum-drying process at high temperatures, and thus, crystallinity of the PVdF was increased (higher than 58), and accordingly, overall resistance was increased.

It should be appreciated that a person skilled in the art to which the present invention pertains may variously apply and modify the aforementioned contents within the scope of the present invention.

INDUSTRIAL AVAILABILITY

As described above, since the electrode for a rechargeable battery of the present invention uses the binder having crystallinity of 58 or higher in a partial electrode composite layer forming the multi-layered electrode, elongation percentage of the multi-layered electrode may be reduced to reduce a short-circuit area at the time of needle-shaped penetration and increase IR resistance, and thus, safety of the battery may be effectively enhanced without an additional process or material.

The invention claimed is:

1. A method for manufacturing the electrode for a rechargeable battery in which a current collector is coated with an electrode mixture including an electrode active material and a binder, the method comprising:
(i) applying a first slurry including PVdF as a first binder and a first electrode active material to a current collector, subsequently firstly drying the slurry at 120 to 140° C. under an air atmosphere for about 2 minutes to 5 minutes, and secondly drying the slurry at 150 to 190° C. in a vacuum state to form a first electrode composite layer for about 12 hours to 30 hours; and (ii) applying a second slurry including a second binder and a second electrode active material to the first electrode composite layer and subsequently drying the slurry at 120 to 140° C. under an air atmosphere for about 2 minutes to 5 minutes to form a dried slurry and rolling the dried slurry to form a second electrode composite layer, wherein crystallinity of the first binder is 58% or greater, and the second binder has crystallinity of less than 58%.

2. The method of claim 1, wherein the second binder is PVdF.

3. The method of claim 1, wherein the electrode is a positive electrode.

4. The method of claim 1, wherein a thickness of the first electrode composite layer is 5 to 45% of a thickness of the second electrode composite layer.

5. The method of claim 1, wherein a compound of the first electrode active material of the first electrode composite layer and a compound of the second electrode active material of the second electrode composite layer are the same.

6. The method of claim 1, wherein a content of the first binder and a content of the second binder are 1 to 15 wt % with respect to a total weight of each of the first and second electrode composite layers, respectively.

7. The method of claim 1, wherein the first electrode composite layer and the second electrode composite layer each further comprises a conductive material having electronic conductivity.

8. The method of claim 1, wherein a content of the conductive material is 20 parts by weight to 100 parts by weight based on 100 parts by weight of the first binder and the second binder.

* * * * *